(12) United States Patent
Chen et al.

(10) Patent No.: US 8,371,174 B2
(45) Date of Patent: Feb. 12, 2013

(54) MICRO-DEFORMABLE PIEZORESISTIVE MATERIAL AND MANUFACTURING METHOD THEREOF AND PRESSURE SENSOR USING THE SAME

(75) Inventors: Yi-Ling Chen, Hsinchu (TW); Chih Sheng Hou, Taipei (TW); Chia-Hung Chou, Taipei County (TW)

(73) Assignee: Universal Cement Corporation, Taipei (TW)

( * ) Notice: Subject to any disclaimer, the term of this patent is extended or adjusted under 35 U.S.C. 154(b) by 486 days.

(21) Appl. No.: 12/651,383

(22) Filed: Dec. 31, 2009

(65) Prior Publication Data

US 2011/0048139 A1  Mar. 3, 2011

Related U.S. Application Data

(60) Provisional application No. 61/238,548, filed on Aug. 31, 2009.

(51) Int. Cl.
 *G01L 9/06* (2006.01)
(52) U.S. Cl. ............ 73/727; 73/715; 73/721; 361/283.4
(58) Field of Classification Search .................. None
 See application file for complete search history.

(56) References Cited

U.S. PATENT DOCUMENTS

| | | | | |
|---|---|---|---|---|
| 3,493,768 A | * | 2/1970 | Kohashi | 250/214 LA |
| 4,495,434 A | * | 1/1985 | Diepers et al. | 310/338 |
| 5,132,583 A | * | 7/1992 | Chang | 310/339 |
| 5,302,936 A | | 4/1994 | Yaniger | |
| 5,510,812 A | * | 4/1996 | O'Mara et al. | 345/161 |
| 5,541,570 A | | 7/1996 | McDowell | |
| 5,695,859 A | * | 12/1997 | Burgess | 428/209 |
| 5,859,700 A | | 1/1999 | Yang | |
| 5,886,615 A | * | 3/1999 | Burgess | 338/114 |
| 5,910,355 A | * | 6/1999 | Burgess | 428/209 |
| 6,072,130 A | * | 6/2000 | Burgess | 200/86 R |
| 6,114,645 A | * | 9/2000 | Burgess | 200/512 |
| 6,121,869 A | * | 9/2000 | Burgess | 338/99 |
| 6,329,617 B1 | * | 12/2001 | Burgess | 200/61.43 |
| 6,388,556 B1 | | 5/2002 | Imai et al. | |
| 6,534,430 B2 | * | 3/2003 | Makino et al. | 501/152 |
| 6,877,385 B2 | | 4/2005 | Fang et al. | |
| 7,112,755 B2 | | 9/2006 | Kitano et al. | |

* cited by examiner

*Primary Examiner* — Lisa Caputo
*Assistant Examiner* — Jermaine Jenkins (57) ABSTRACT

A micro-deformable piezoresistive material is provided, including a hard plastic body, a micro-deformable rough texture surface, and a plurality of conductive particles. The micro-deformable rough texture surface is formed on a side of the hard plastic body, wherein the maximum deformation of the rough texture surface is far less than the thickness of the hard plastic body. Additionally, the conductive particles are evenly dispersed in the plastic body.

21 Claims, 13 Drawing Sheets

MICRO-DEFORMABLE PIEZORESISTIVE MATERIAL AND MANUFACTURING METHOD THEREOF AND PRESSURE SENSOR USING THE SAME

CROSS REFERENCE TO RELATED APPLICATIONS

This application claims priority of Provisional Patent Application Ser. No. 61/238,548, filed on Aug. 31, 2009, the entirety of which is incorporated by reference herein.

BACKGROUND OF THE INVENTION

1. Field of the Invention

This application relates in general to a piezoresistive material and in particular to a piezoresistive material having a micro-deformable rough texture surface.

2. Description of the Related Art

Conventional piezoresistive materials are elastic. Resistance of the piezoresistive material can be calculated by the equation $R=\rho*L/A$, wherein R is the electrical resistance of a uniform specimen of the material (measured in ohms, $\Omega$), $\rho$ is the resistivity of the material (measured in ohms-centimeters, $\Omega$-cm), L is the length of the piece of material (measured in centimeters, cm), and A is the cross-sectional area of the specimen (measured in square centimeters, $cm^2$). According to the equation $R=\rho*L/A$, the resistance R of the piezoresistive material increases with the decrease of the length/thickness L.

When an external pressure, exerted on the piezoresistive material, is released, the piezoresistive material can recover to an original state by viscoelasticity thereof for a period. However, the piezoresistive material could result in hysteresis and inaccurate pressure measurement after repeated operations.

Figure 1:
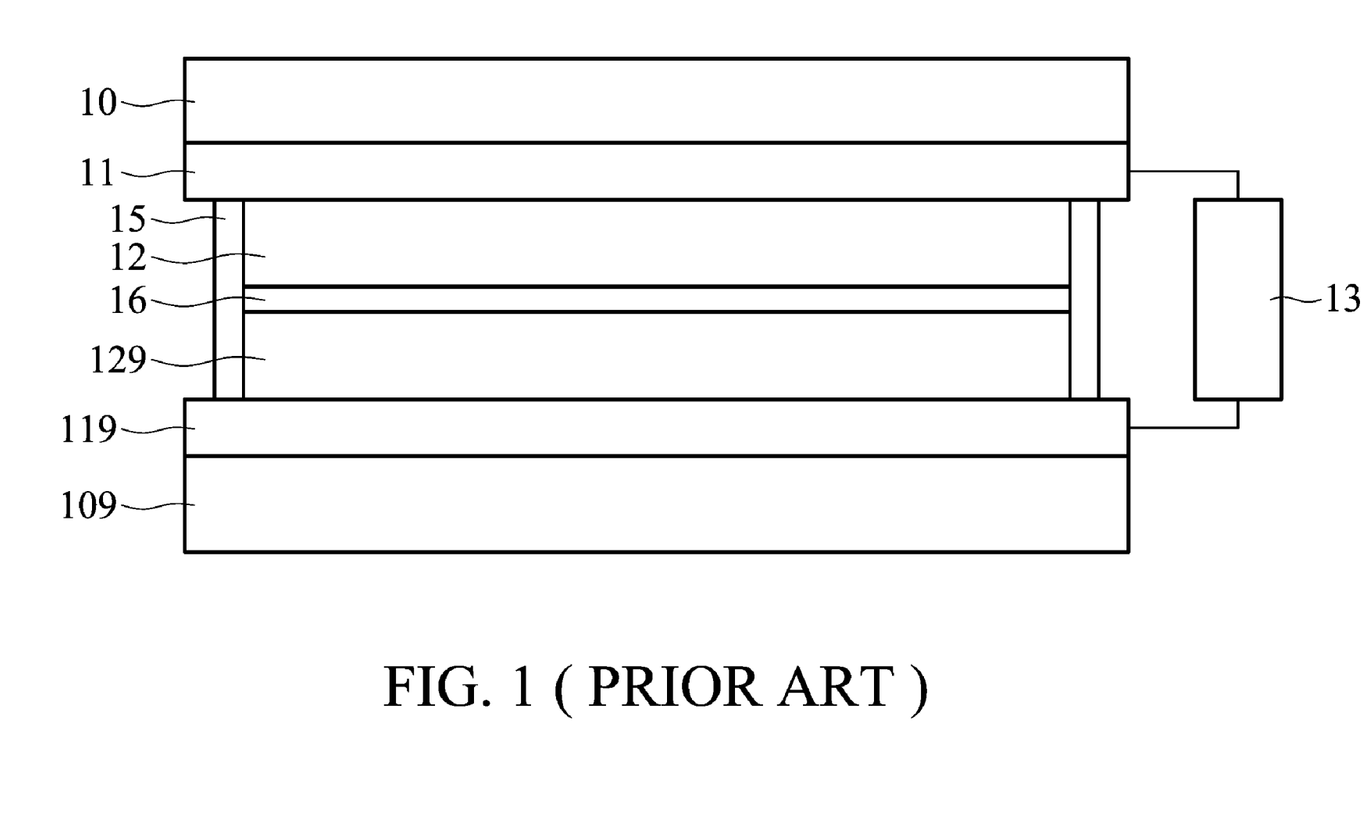
FIGS. 1-3 are perspective diagrams of a conventional pressure sensor.
Figure 2:
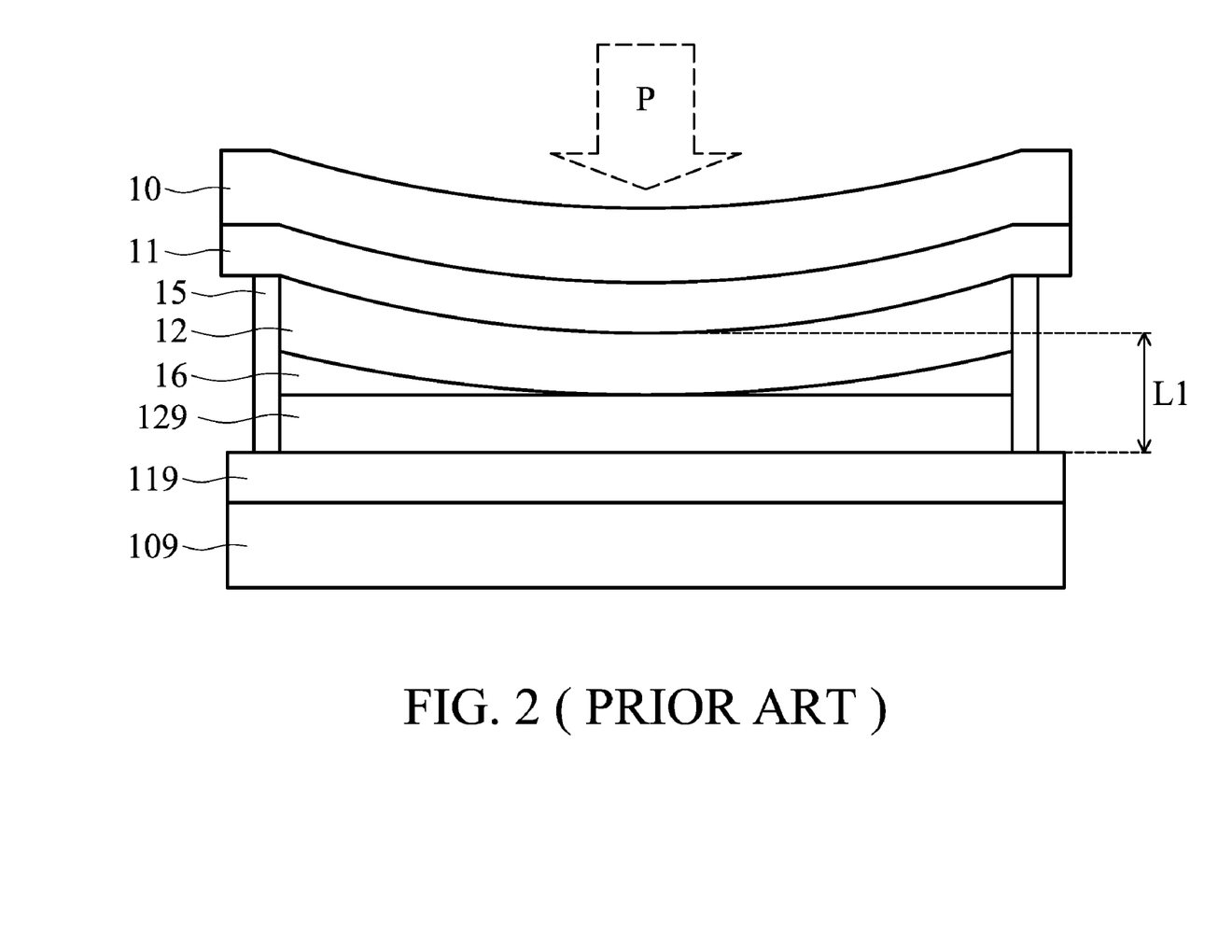

Referring to FIG. 1, a conventional pressure sensor comprises two substrates 10 and 109 disposed on top and bottom sides therefore. Two metal electrodes 11 and 119 are disposed on the substrates 10 and 109, and two piezoresistive layers 12 and 129 are respectively disposed on the metal electrodes 11 and 119 with a space 16 formed therebetween. A supporter 15 is disposed between the substrates 10 and 109 to fix the two piezoresistive layers 12 and 129, so as to form the space 16 therebetween. As shown in FIG. 1, the metal electrodes 11 and 119 are electrically connected to a circuit system 13. When pressure P is applied to the pressure sensor, as shown in FIG. 2, the piezoresistive layer 12 deforms downwardly and contacts the piezoresistive layer 129, wherein the piezoresistive layers 12 and 129 have a total thickness of L1. Hence, an output resistance R1 of the pressure sensor can be determined by the equation $R1=\rho*L1/A$.

Figure 3:
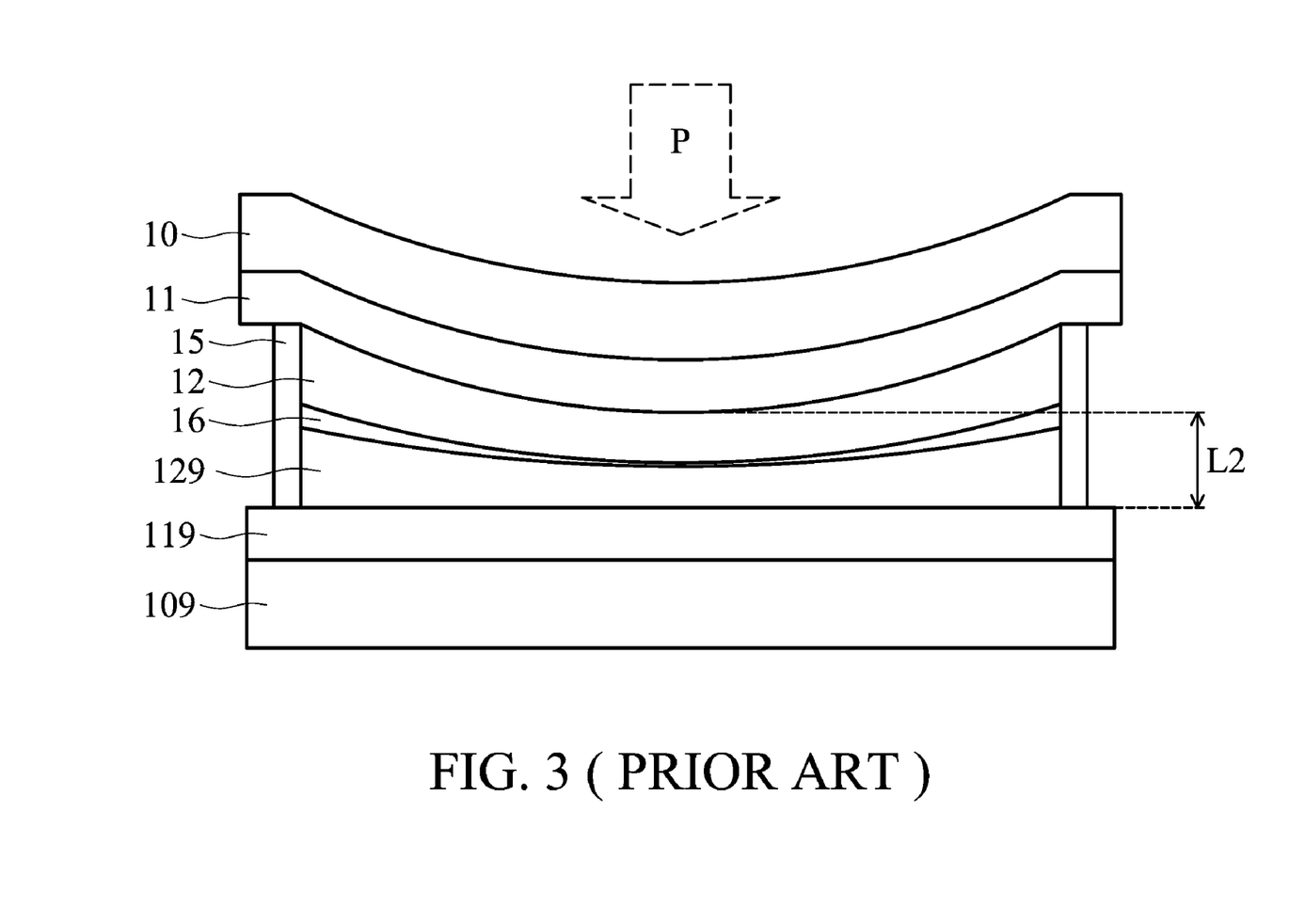

When pressure sensor is further pressed and deformed as shown in FIG. 3, the total thickness of the piezoresistive layers 12 and 129 is reduced to L2. In this state, an output resistance R2 of the pressure sensor can be determined by the equation $R2=\rho*L2/A$.

Figure 4A:
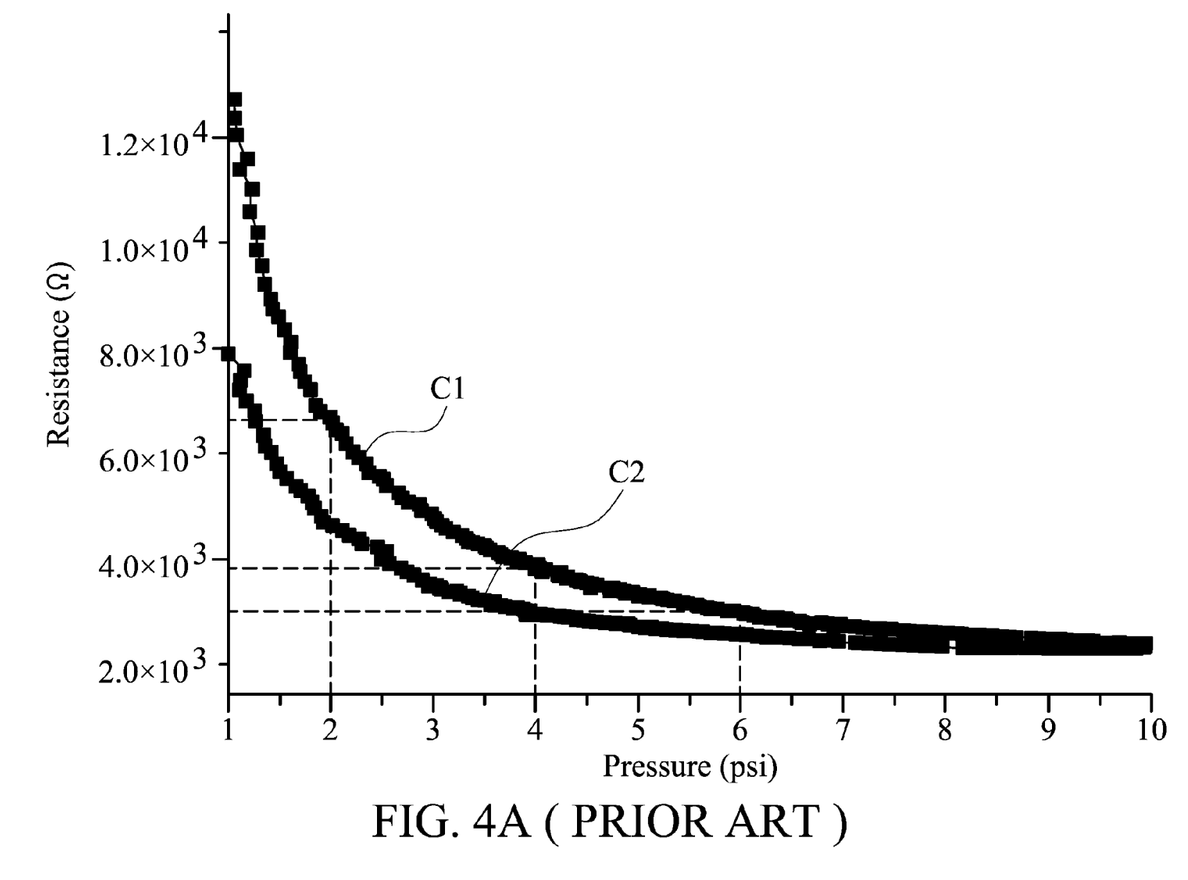
FIG. 4A is a pressure-resistance diagram in accordance with the pressure sensor of FIG. 1.

FIG. 4A is a pressure-resistance diagram in accordance with the pressure sensor of FIG. 1. The curve C1 in FIG. 4A illustrates the pressure-resistance characteristics when pressure is applied to the pressure sensor and increased from 1 to 10 psi. Additionally, the curve C2 in FIG. 4A illustrates the pressure-resistance characteristics when pressure is released and decreased from 10 to 1 psi.

Referring to the curve C1, when pressure increases to 2, 4, 6, 8 and 10 psi, the output resistance respectively decreases to $6.69*10^3$, $3.86*10^3$, $2.95*10^3$, $2.54*10^3$, and $2.27*10^3 \Omega$.

However, as shown in the curve C2, when pressure is released and decreases from 10 psi to 8, 6, 4, and 2 psi, the output resistance increases from $2.22*10^3$ to $2.31*10^3$, $2.53*10^3$, $2.96*10^3$ and $4.64*10^3 \Omega$. The hysteresis phenomena of the pressure-resistance characteristics in conventional piezoresistive materials can be easily observed in curves C1 and C2 shown in FIG. 4A.

Figure 4B:
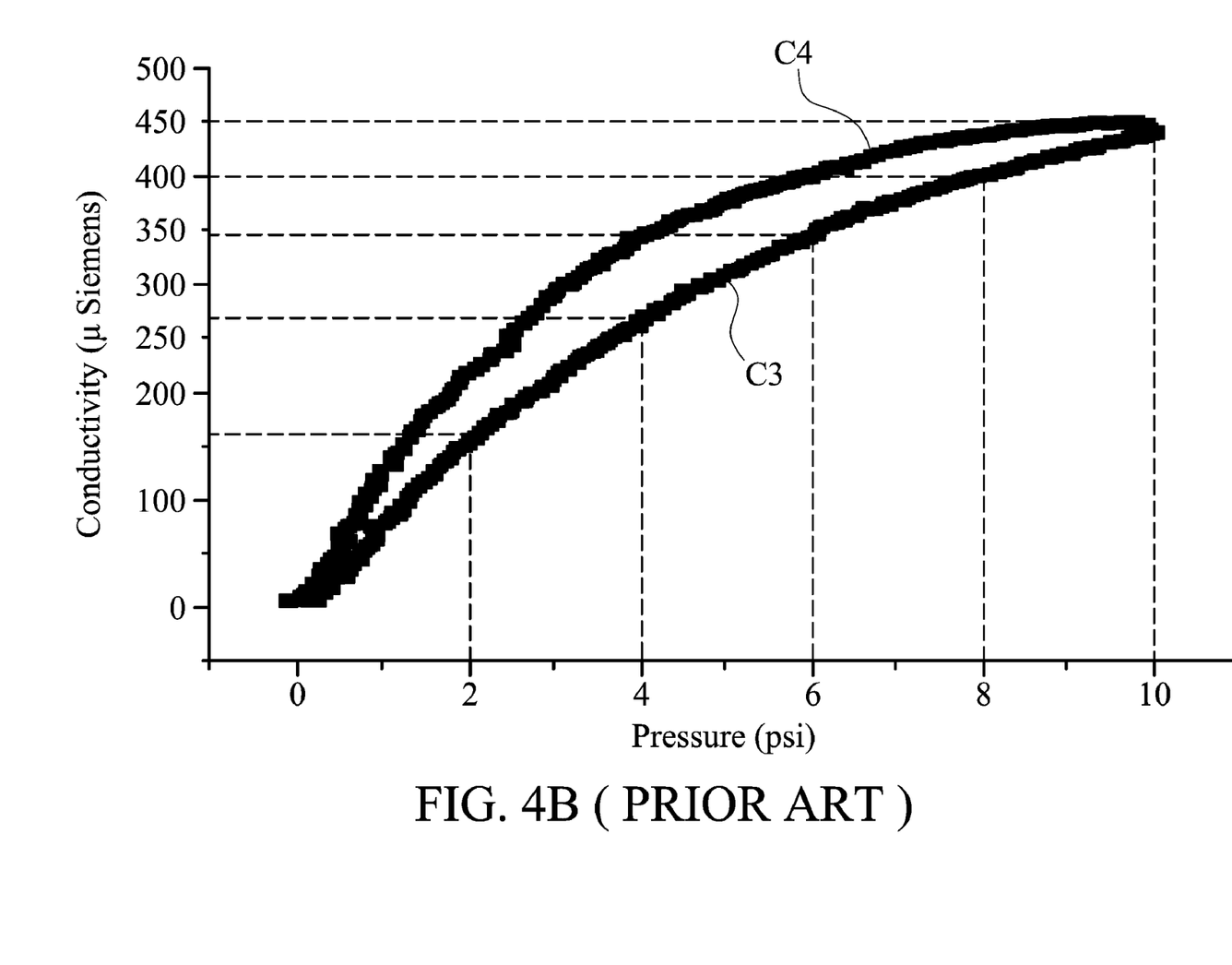
FIG. 4B is a pressure-conductivity diagram in accordance with the pressure sensor of FIG. 1.

FIG. 4B is a pressure-conductivity diagram in accordance with the pressure sensor of FIG. 1, wherein the conductivity is the inverse of resistivity. The curve C3 in FIG. 4B illustrates pressure-conductivity characteristics when pressure is applied to the pressure sensor and increased from 0 to 10 psi. Additionally, the curve C4 in FIG. 4B illustrates pressure-resistance characteristics when pressure is released and decreased from 10 to 0 psi.

As the curve C3 shown in FIG. 4B, when pressure is 2, 4, 6, 8 and 10 psi, the conductivity is $1.49*10^2$, $2.59*10^2$, $3.39*10^2$, $3.94*10^2$, and $4.41*10^2$ µsiemens, respectively. When pressure decreases from 10 psi to 8, 6, 4, and 2 psi, as the curve C3 shown in FIG. 4B, the conductivity decreases from $4.50*10^2$ µ-siemens to $4.33*10^2$, $3.95*10^2$, $3.38*10^2$ and $2.16*10^2$ µ-siemens, respectively. The hysteresis phenomena of the piezoresistive materials are obvious and usually occur in conventional pressure sensors as the curves C3 and C4 show in FIG. 4B.

BRIEF SUMMARY OF INVENTION

Embodiments disclosed herein may provide a micro-deformable piezoresistive material including a hard plastic body with a plurality of conductive particles evenly dispersed therein. An embodiment of the application provides a pressure sensor comprising a first electrode layer, a second electrode, a first piezoresistive layer, a second piezoresistive layer, and a supporter. The first and second piezoresistive layers comprise the micro-deformable piezoresistive material and respectively connect to the first and second electrode layers. The supporter is provided to form a space between the first and second piezoresistive layers.

Another embodiment of the application provides a method for manufacturing a micro-deformable piezoresistive material, comprising: providing a plurality of conductive particles and a plastic substance; blending the plastic substance and the conductive particles together to form a piezoresistive compound; printing the piezoresistive compound on a target body; and solidifying the piezoresistive compound.

BRIEF DESCRIPTION OF DRAWINGS

The invention can be more fully understood by reading the subsequent detailed description and examples with references made to the accompanying drawings, wherein.

DETAILED DESCRIPTION OF INVENTION

Figure 5:
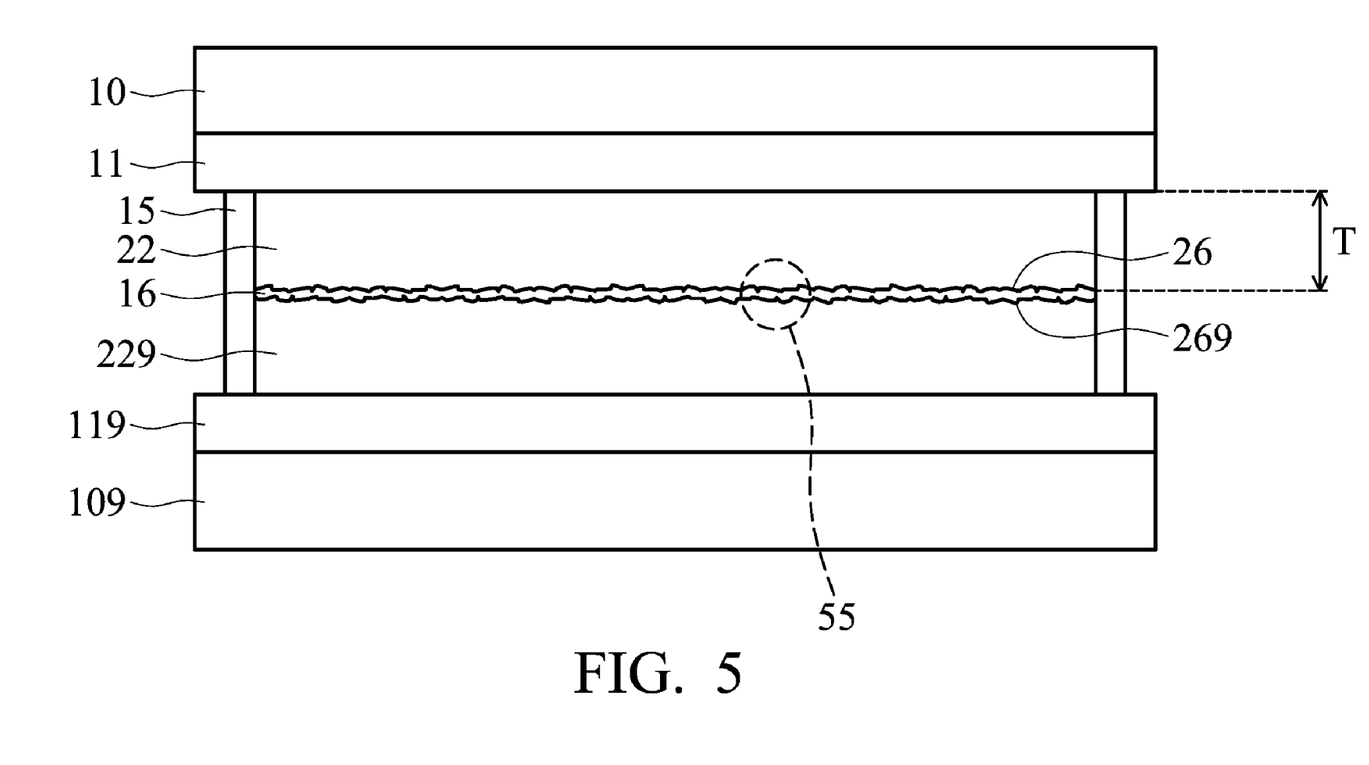
FIG. 5 is a perspective diagram of a pressure sensor according to an embodiment of the invention.

FIG. 5 illustrates a pressure sensor structure according to an embodiment of the invention. The pressure sensor structure is based on the configuration of FIG. 1, wherein two piezoresistive layers 22 and 229 in the middle of the pressure sensor comprise hard plastic material which has a young's modulus exceeding 0.2 GPa. The supporter 15 is provided for fixing the piezoresistive layers 22 and 229, so as to form the space 16 therebetween. Specifically, two micro-deformable rough texture surfaces 26 and 269 are respectively formed on the piezoresistive layers 22 and 229 and are opposite to each other. In some embodiments, the plastic material may comprise phenol resin, urea resin, melamine resin, unsaturated polyester resin, epoxy resin, silicone resin, or polyurethane resin (PU).

Figure 6:
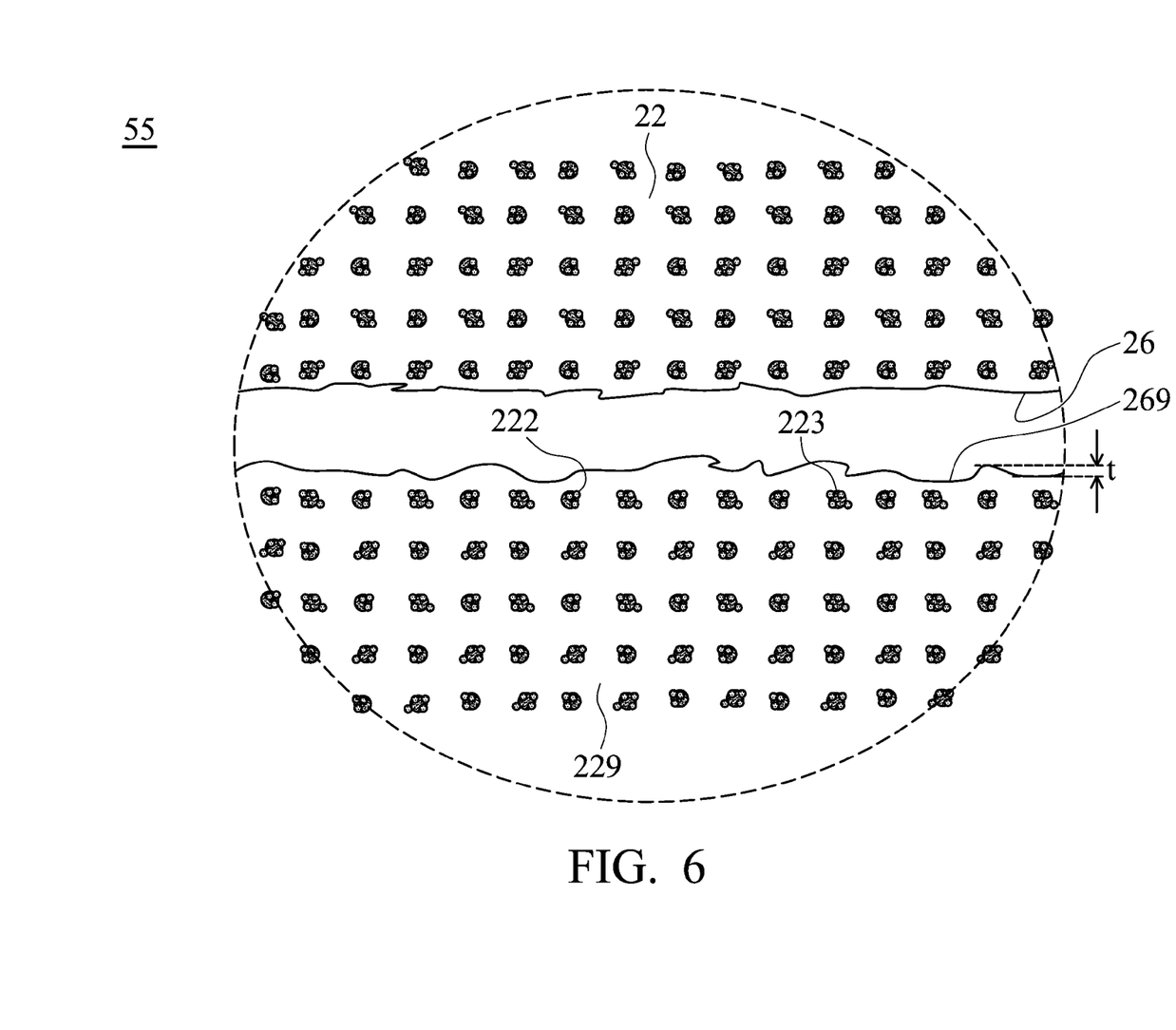
FIG. 6 is a large view of the portion 55 in FIG. 5.

FIG. 6 is a large view of the portion 55 in FIG. 5, wherein a plurality of conductive particles 222 and dispersant particles 223 are evenly dispersed in the plastic bodies of the piezoresistive layers 22 and 229. The dispersant particles 223 may comprise modified $SiO_2$ which can be blended and evenly dispersed in the plastic bodies. During the blending process, the dispersant particles 223 can attract the conductive particles 222, such that the conductive particles 222 are attached to the dispersant particles 223 and evenly distributed in the piezoresistive layers 22 and 229. In some embodiments, the weight percent of the conductive particles 222 in the piezoresistive material is between 10%-50%.

In this embodiment, roughness t of the micro-deformable surfaces 26 and 269 relative to the thickness T (FIG. 5) of the piezoresistive layer 22/229 is between 1-10%, and the maximum deformation of the surfaces 26 and 269 along a vertical direction is less than 0.02 t. Namely, the maximum deformation of the surfaces 26 and 269 is about 0.02-0.2% (even less than 0.2%) with respect to the whole thickness of the piezoresistive layers 22 and 229. The deformation can be negligible because it is far less than the thickness T of the piezoresistive layer 22/229. In some embodiments, the dispersant particles 223 may comprise modified $SiO_2$ or oxide of Si, Ti, Al, Cu, Zn, Ca, Sn, W, or Cr.

Figure 7:
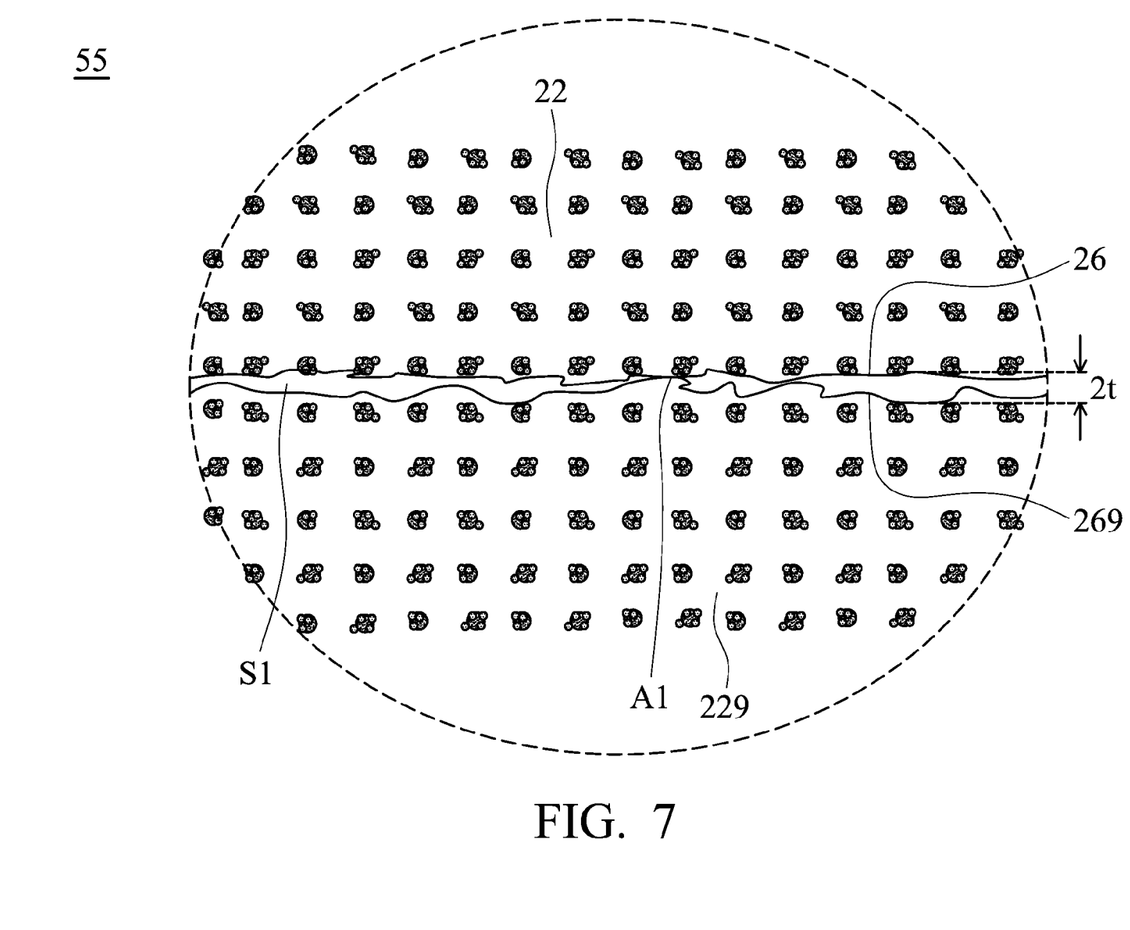
FIG. 7 is another large view of the portion 55 in FIG. 5 when pressure initially applied to the pressure sensor.

FIG. 7 is another large view of the portion 55 in FIG. 5. When pressure is initially applied to the pressure sensor, the piezoresistive layers 22 and 229 are slightly compressed and contact each other through a small contact area A1. As shown in FIG. 7, the gap S1 exists between the surfaces 26 and 269 when the piezoresistive layers 22 and 229 start contacting each other. Hence, an output resistance R1 in the state of FIG. 7 can be determined according to the equation of $R1=\rho*L/A1$.

Figure 8:
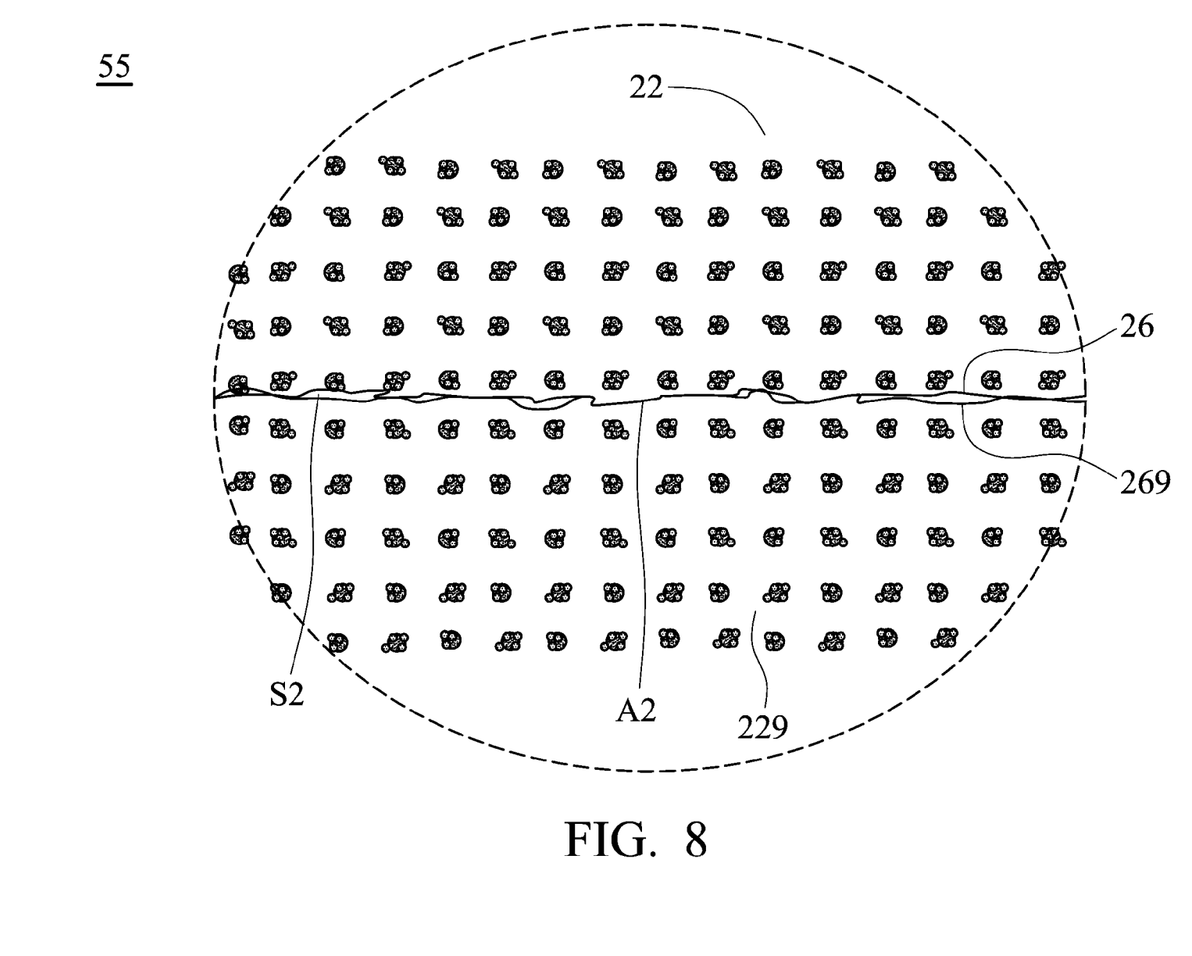
FIG. 8 is another large view of the portion 55 in FIG. 5 when the piezoresistive layers tightly contact each other.

FIG. 8 is another large view of the portion 55 in FIG. 5, wherein the piezoresistive layers 22 and 229 tightly contact each other through a large contact area A2. Comparing FIG. 8 with FIG. 7, following increased pressure exerted to the pressure sensor, the contact area is increased from A1 to A2, and the gap is reduced from S1 to S2. The output resistance R2 in the state of FIG. 8 can be determined according to the equation of $R2=\rho*L/A2$. The thickness T of the piezoresistive layer 22/229 is fairly constant because variation of the thickness T is minute and negligible.

Figure 9A:
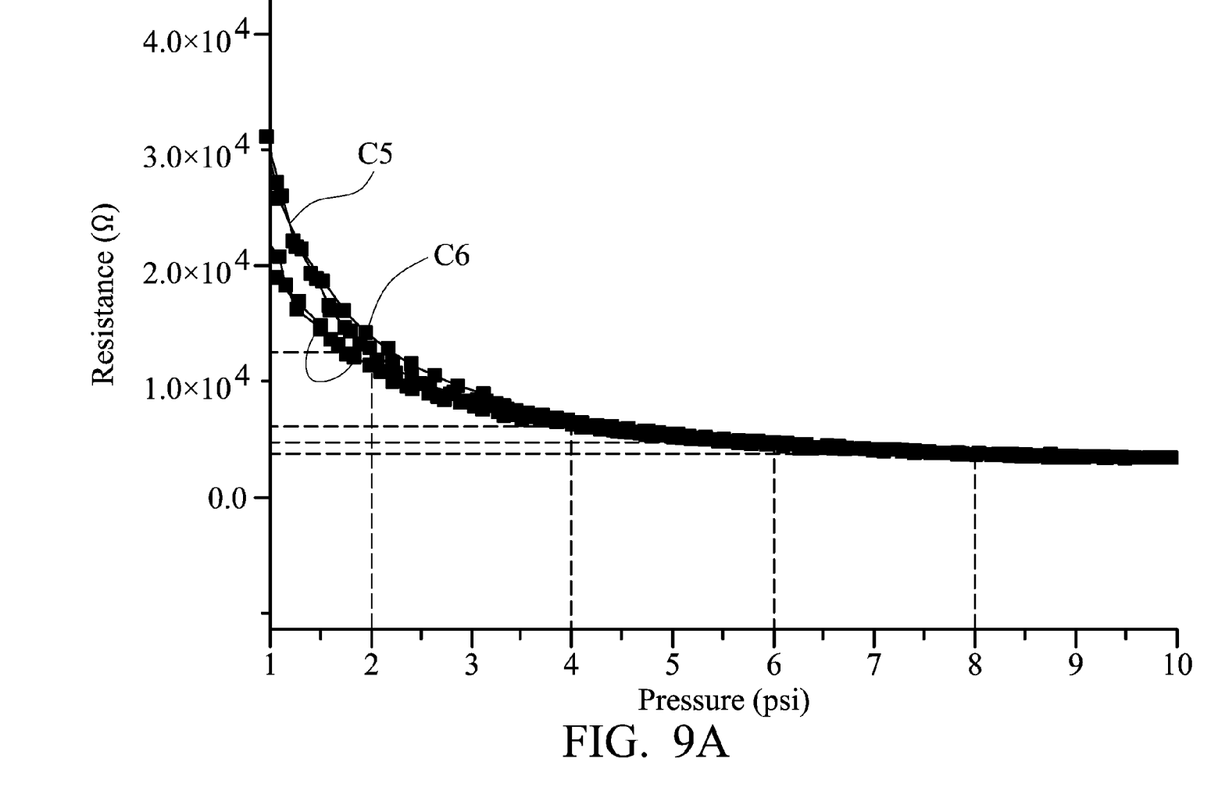
FIG. 9A is a pressure-resistance diagram in accordance with the pressure sensor of FIG. 5.

FIG. 9A is a pressure-resistance diagram in accordance with the pressure sensor of FIG. 5. The curve C5 in FIG. 9A illustrates the pressure-resistance characteristics when pressure is applied to the pressure sensor and increased from 1 to 10 psi. Additionally, the curve C6 in FIG. 9A illustrates the pressure-resistance characteristics when pressure is released and decreased from 10 to 1 psi.

Referring to the curve C5, when pressure increases to 2, 4, 6, 8 and 10 psi, the output resistance respectively decreases to $1.26*10^4$, $6.68*10^3$, $4.79*10^3$, $3.94*10^3$, and $3.56*10^3 \Omega$. However, as the curve C2 in FIG. 9A shows, when pressure is released and decreased from 10 psi to 8, 6, 4, and 2 psi, the output resistance increases from $3.51*10^3 \Omega$ to $3.87*10^3$, $4.69*10^3$, $6.54*10^3$ and $1.13*10^4 \Omega$. According to this embodiment, the hysteresis phenomena of the pressure-resistance characteristics can be efficiently eliminated. When pressure exceeds 2 psi, the curves C5 and C6 are approximately identical, thus facilitating accuracy and reliability of the pressure sensor.

Figure 9B:
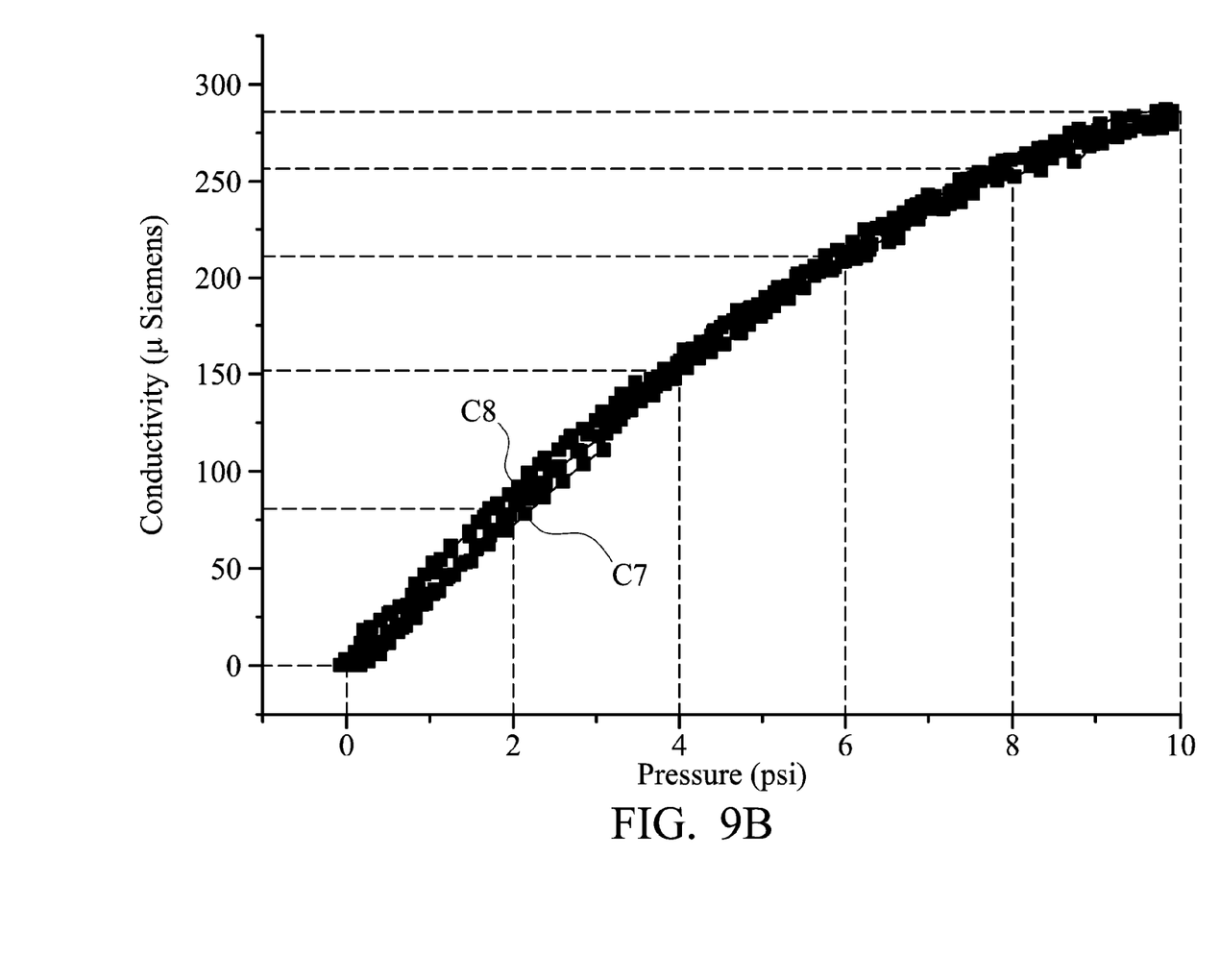
FIG. 9B is a pressure-conductivity diagram in accordance with the pressure sensor of FIG. 5.

FIG. 9B is a pressure-conductivity diagram in accordance with the pressure sensor of FIG. 5. The curve C7 in FIG. 9B illustrates the pressure-conductivity characteristics of the pressure sensor when pressure is applied thereto and increased from 0 to 10 psi. Additionally, the curve C8 in FIG. 9B illustrates the pressure-conductivity characteristics when pressure is released and decreased from 10 to 0 psi.

Referring to the curve C7, when pressure is 2, 4, 6, 8 and 10 psi, the conductivity is $7.94*1$, $1.50*1$, $2.09*10^2$, $2.54*10^2$, and $2.81*10^2$ μ-siemens, respectively. Additionally, as the curve C8 shows in FIG. 9B, when pressure is released and decreased from 10 psi to 8, 6, 4, and 2 psi, the output conductivity decreases from $2.85*10^2$ μ-siemens to $2.58*10^2$, $2.13*10^2$, $1.55*10^2$ and $8.88*10^1$ μ-siemens, respectively. Since the curves C7 and C8 are approximately identical, the hysteresis phenomena of the pressure-resistance characteristics are efficiently eliminated.

Figure 10A:
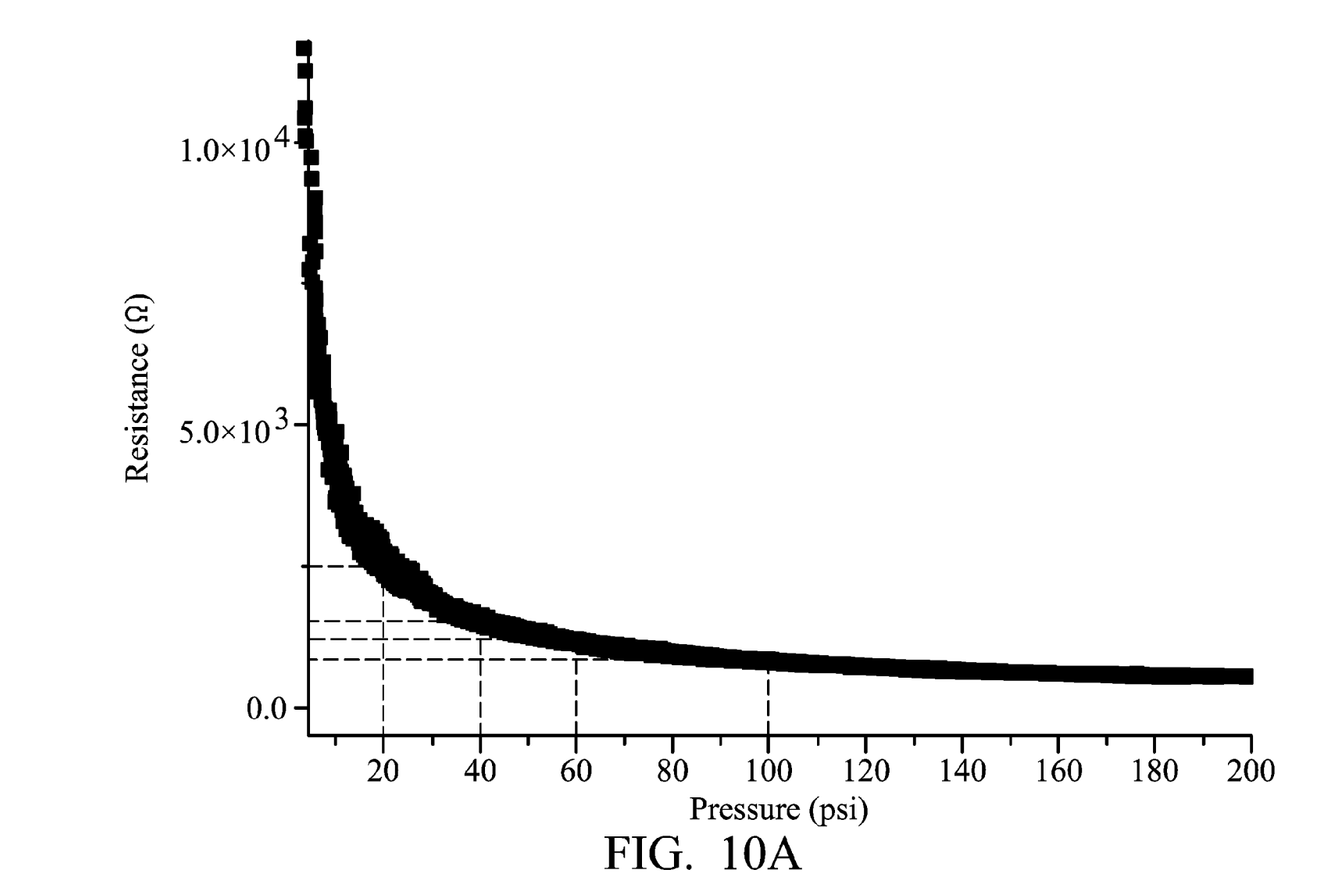
FIG. 10A is a pressure-resistance diagram in accordance with another embodiment of the pressure sensor of FIG. 5.

FIG. 10A is a pressure-resistance diagram in accordance with another embodiment of the pressure sensor in FIG. 5. In this embodiment, polyester resin in xylene is used as the plastic body of the piezoresistive layers 22 and 229. The piezoresistive layers 22 and 229 further comprise a plurality of conductive particles 22 of 10 weight percent and carbon black dispersant particles of 20 weight percent which are blended and evenly dispersed in the plastic body. In this embodiment, the piezoresistive layers 22 and 229 are formed on the metal electrodes 11 and 119 by polyester screen printing. After solidification of the piezoresistive layers 22 and 229, the micro-deformable rough texture surfaces 26 and 269 can have a roughness t less than 10% relative to the thickness T of the piezoresistive layer 26/269.

Figure 10B:
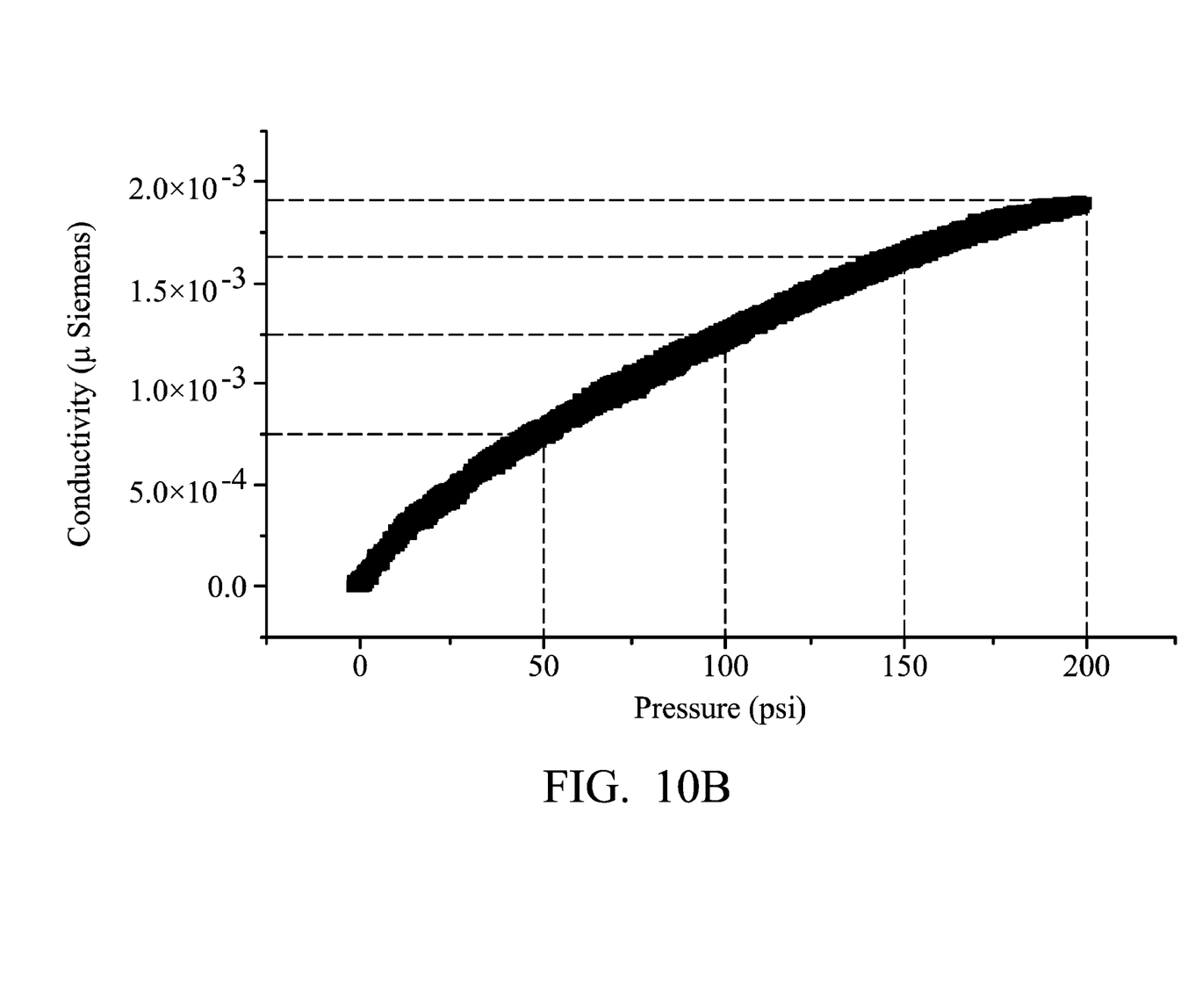
FIG. 10B is a pressure-conductivity diagram in accordance with another embodiment of the pressure sensor of FIG. 5.

The pressure-resistance diagram of FIG. 10A is presented according to the conditions mentioned above. When pressure is 50, 100, 150, and 200 psi, the output resistance is $1.38*10^3$, $8.32*10^2$, $6.28*10^2$, and $5.34*10^2 \Omega$, respectively. Referring to FIG. 10, it shows that the hysteresis phenomena of the pressure-resistance characteristics are efficiently eliminated, and whenever the pressure is increased or released/decreased, the curves are approximately identical. Additionally, as shown in FIG. 10B, when pressure is 50, 100, 150, and 200 psi, the output conductivity is $7.25*10^2$, $1.20*10^3$, $1.59*10^3$, and $1.87*10^3$ μ-siemens, respectively. The hysteresis phenomena of the pressure-resistance characteristics are efficiently eliminated, thus facilitating accuracy and repeatability of the pressure sensor.

While the invention has been described by way of example and in terms of embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A micro-deformable piezoresistive material, comprising:
   a hard plastic body; and
   a plurality of conductive particles, evenly dispersed in the plastic body,
   the micro-deformable piezoresistive material further comprising a texture surface formed on a side of the hard plastic body, wherein the roughness of the texture surface relative to the thickness of the hard plastic body is between 1-10%.

2. The micro-deformable piezoresistive material as claimed in claim 1, wherein a maximum deformation of the texture surface is less than 2% of the roughness of the texture surface.

3. The micro-deformable piezoresistive material as claimed in claim 1, further comprising a plurality of dispersant particles evenly dispersed in the hard plastic body.

4. The micro-deformable piezoresistive material as claimed in claim 3, wherein the dispersant particles comprise modified $SiO_2$ or oxide of Si, Ti, Al, Ca, Sn, W, or Cr.

5. The micro-deformable piezoresistive material as claimed in claim 3, wherein the conductive particles are attached to the dispersant particles to form clusters of particles, and the clusters of particles are evenly dispersed in the plastic body.

6. The micro-deformable piezoresistive material as claimed in claim 1, wherein the weight percent of the conductive particles in the micro-deformable piezoresistive material is between 10%-50%.

7. The micro-deformable piezoresistive material as claimed in claim 1, wherein the hard plastic body comprises phenol resin, urea resin, melamine resin, unsaturated polyester resin, epoxy resin, silicone resin, or polyurethane resin (PU).

8. The micro-deformable piezoresistive material as claimed in claim 1, wherein the young's modulus of the hard plastic body exceeds 0.2 GPa.

9. A pressure sensor, comprising:
   a first electrode layer;
   a first piezoresistive layer, connecting to the first electrode layer and comprising a micro-deformable piezoresistive material, the piezoresistive material comprising a hard plastic body and a plurality of conductive particles evenly dispersed in the plastic body;
   a second electrode layer;
   a second piezoresistive layer, connecting to the second electrode layer and comprising the micro-deformable piezoresistive material, wherein the first and second piezoresistive layers are apart from and opposite to each other with a space formed therebetween; and
   a supporter, fixing the first and second piezoresistive layers to form the space therebetween.

10. The pressure sensor as claimed in claim 9, wherein the piezoresistive material further comprises a plurality of dispersant particles evenly dispersed in the plastic body.

11. The pressure sensor as claimed in claim 10, wherein the dispersant particles comprise modified $SiO_2$ or oxide of Si, Ti, Al, Cu, Zn, Ca, Sn, W, or Cr.

12. The pressure sensor as claimed in claim 10, wherein the conductive particles are attached to the dispersant particles to form clusters of particles, and the clusters of particles are evenly dispersed in the plastic body.

13. The pressure sensor as claimed in claim 9, wherein the weight percent of the conductive particles in the micro-deformable piezoresistive material is between 10%-50%.

14. The pressure sensor as claimed in claim 9, wherein the plastic body comprises phenol resin, urea resin, melamine resin, unsaturated polyester resin, epoxy resin, silicone resin, or polyurethane resin (PU).

15. A method for manufacturing a micro-deformable piezoresistive material, comprising:
   providing a plurality of conductive particles and a plastic substance;
   blending the plastic substance and the conductive particles together to form a piezoresistive compound;
   printing the piezoresistive compound on a target body; and
   solidifying the piezoresistive compound.

16. The method as claimed in claim 15, further comprising:
   providing a plurality of dispersant particles and blending the plastic substance, the conductive particles and the dispersant particles together to form the piezoresistive compound.

17. The method as claimed in claim 16, wherein the dispersant particles comprise modified $SiO_2$ or oxide of Si, Ti, Al, Cu, Zn, Ca, Sn, W, or Cr.

18. The method as claimed in claim 16, wherein the conductive particles are attached to the dispersant particles to form clusters of particles, and the clusters of particles are evenly dispersed in the plastic substance.

19. The method as claimed in claim 15, wherein the weight percent of the conductive particles in the micro-deformable piezoresistive material is between 10%-50%.

20. The method as claimed in claim 15, wherein the plastic substance comprises phenol resin, urea resin, melamine resin, unsaturated polyester resin, epoxy resin, silicone resin, or polyurethane resin (PU).

21. A pressure sensor, comprising:
   a first electrode layer;
   a first piezoresistive layer, connecting to the first electrode layer and comprising a micro-deformable piezoresistive material, the piezoresistive material comprising a hard plastic body and a plurality of conductive particles evenly dispersed in the plastic body;
   a second electrode layer; and
   a second piezoresistive layer, connecting to the second electrode layer and comprising the micro-deformable piezoresistive material, wherein the first and second piezoresistive layers are apart from and opposite to each other with a space formed therebetween.

* * * * *